US011861295B2

(12) United States Patent
Li et al.

(10) Patent No.: US 11,861,295 B2
(45) Date of Patent: Jan. 2, 2024

(54) ENCODING A JOB POSTING AS AN EMBEDDING USING A GRAPH NEURAL NETWORK

(71) Applicant: Microsoft Technology Licensing, LLC, Redmond, WA (US)

(72) Inventors: Shan Li, Santa Clara, CA (US); Baoxu Shi, Sunnyvale, CA (US); Jaewon Yang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 17/511,162

(22) Filed: Oct. 26, 2021

(65) Prior Publication Data
US 2023/0125711 A1    Apr. 27, 2023

(51) Int. Cl.
*G06F 40/16* (2020.01)
*G06F 40/40* (2020.01)
*G06N 3/04* (2023.01)
*G06F 18/214* (2023.01)
*G06F 18/2137* (2023.01)

(52) U.S. Cl.
CPC ............ *G06F 40/16* (2020.01); *G06F 18/214* (2023.01); *G06F 18/21375* (2023.01); *G06F 40/40* (2020.01); *G06N 3/04* (2013.01)

(58) Field of Classification Search
CPC ........ G06F 40/10; G06F 40/12; G06F 40/151; G06F 40/16; G06F 40/40; G06F 18/00; G06F 18/20; G06F 18/21; G06F 18/213; G06F 18/2137; G06F 18/21375; G06F 18/214; G06Q 10/00; G06Q 10/1053; G06Q 10/063112; G06N 3/02; G06N 3/04; G06N 3/042; G06N 3/08; G06N 5/01; G06N 5/02; G06N 5/022; G06N 5/025; G06N 5/04; G06N 20/00
See application file for complete search history.

(56) References Cited

U.S. PATENT DOCUMENTS 11,562,328 B1 *   1/2023   Jiang ................... G06F 16/9535
2020/0074301 A1 *  3/2020   Shang .................... G06N 5/022

OTHER PUBLICATIONS

Shalaby, Walid; AlAila, BahaaEddin; Korayem, Mohammed; Pournajaf, Layla; AlJadda, Khalifeh; Quinn, Shannon; Zadrozny, Wlodek, "Help Me Find a Job: A Graph-based Approach for Job Recommendation at Scale", Jan. 1, 2018, 2017 IEEE International Conference on Big Data (Year: 2018).*

(Continued)

*Primary Examiner* — Andrew C Flanders
*Assistant Examiner* — Alexander Joongie Kim
(74) *Attorney, Agent, or Firm* — Schwegman, Lundberg & Woessner, P.A.

(57) ABSTRACT

Described herein are techniques for using a graph neural network to encode online job postings as embeddings. First, an input graph is defined by processing one or more rules to discover edges that connect nodes in an input graph, where the nodes of the input graph represent job postings or standardized job attributes, and the edges are determined based on analyzing a log of user activity directed to online job postings. Next, a graph neural network (GNN) is trained based on an edge prediction task. Finally, once trained, the GNN is used to derive node embeddings for the nodes (e.g., job postings) of the input graph, and in some instances, new online job postings not represented in the original input graph.

17 Claims, 8 Drawing Sheets

(56) References Cited

OTHER PUBLICATIONS

Liu, Liting; Zhang, Wenzheng; Liu, Jie; Shi, Wenxuan; Huang, Yalou, "Learning Multi-Graph Neural Network for Data-Driven Job Skill Prediction", Jul. 22, 2021, 2021 IEEE International Joint Conference on Neural Networks (Year: 2021).*

Decorte, Jens-Joris; Van Hautte, Jeroen; Demeester, Thomas; Develder, Chris, "JobBERT: Understanding Job Titles through Skills", Sep. 20, 2021, International workshop on Fair, Effective And Sustainable Talent management using data science (FEAST) (Year: 2021).*

* cited by examiner

ENCODING A JOB POSTING AS AN EMBEDDING USING A GRAPH NEURAL NETWORK

TECHNICAL FIELD

The present application describes a technique for using a graph neural network (GNN) to generate an embedding—that is, a vector representation—of a job posting.

BACKGROUND

In the technical fields of machine learning and natural language processing, the term "embedding" is used to describe a technique that generally involves encoding the meaning of some raw data (e.g., text) into a real-valued vector, so that the vector representations of individual instances of the raw data will be close together in the embedding space when the individual instances of raw data have a similar meaning. By way of example, in the specific domain of job titles, the job title, "software engineer," has a meaning that is at least somewhat similar to the job title, "computer programmer." Accordingly, when each job title is represented as a vector in a common embedding space, a measure of distance (e.g., Euclidian distance or Cosine Distance) between the two vectors would be less than the distance between either one of the two vectors and a third vector corresponding with a vector representation for the job title, "dentist." The example presented above involves words as the raw data for which the embeddings are generated. When words are the raw data, the embeddings are generally referred to as text embeddings or word embeddings. However, in other instances, embeddings can be derived for discrete data other than individual words, such as entire sentences, documents, or various combinations of data.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for encoding a job posting as an embedding, using a graph neural network—a type of neural network that operates on graph data. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

An online job hosting service is an online service that allows those who are seeking employees to post online job postings that describe available job opportunities, while simultaneously allowing those seeking job opportunities to search for and browse online job postings. One of the fundamental ways in which most online job hosting services operate is by performing some type of matching between characteristics or attributes of a job opportunity as expressed by the various data fields of the online job posting, with characteristics or attributes of a job-seeking user, as may be embodied in a user profile associated with the job-seeker, or by processing a user's search query. However, because different words may be used to describe or express the same or similar concepts in different job postings, some of the more important characteristics or attributes may be processed to map the concepts expressed by the words to a standardized attribute that may be part of an expert curated knowledge graph, taxonomy, ontology, or some other classification scheme. While referred to herein as standardized attributes, these attributes may also be known as standardized entities.

To that end, job hosting services may use a variety of natural language processing and machine learning techniques to process the raw text of a job posting to derive for the job posting one or more standardized job attributes, such as, titles or job titles, skills, company names, and so forth. These standardized job attributes are then used as job-related features in a variety of machine learning tasks. By way of example, a job recommendation engine may utilize one or more of the standardized job attributes associated with a job posting as a feature for a machine learning model that has been trained to rank a set of job postings for a given user. Similarly, a job-specific search engine may use standardized job attributes as features for a machine learning model trained to rank a set of job postings in response to a user's job search query. However, one of the drawbacks of this approach is that the individual standardized attributes do not provide a holistic representation of the job posting. At best, using only standardized attributes, the overall representation of a job posting may be achieved by concatenating the individual standardized attributes.

Figure 1:
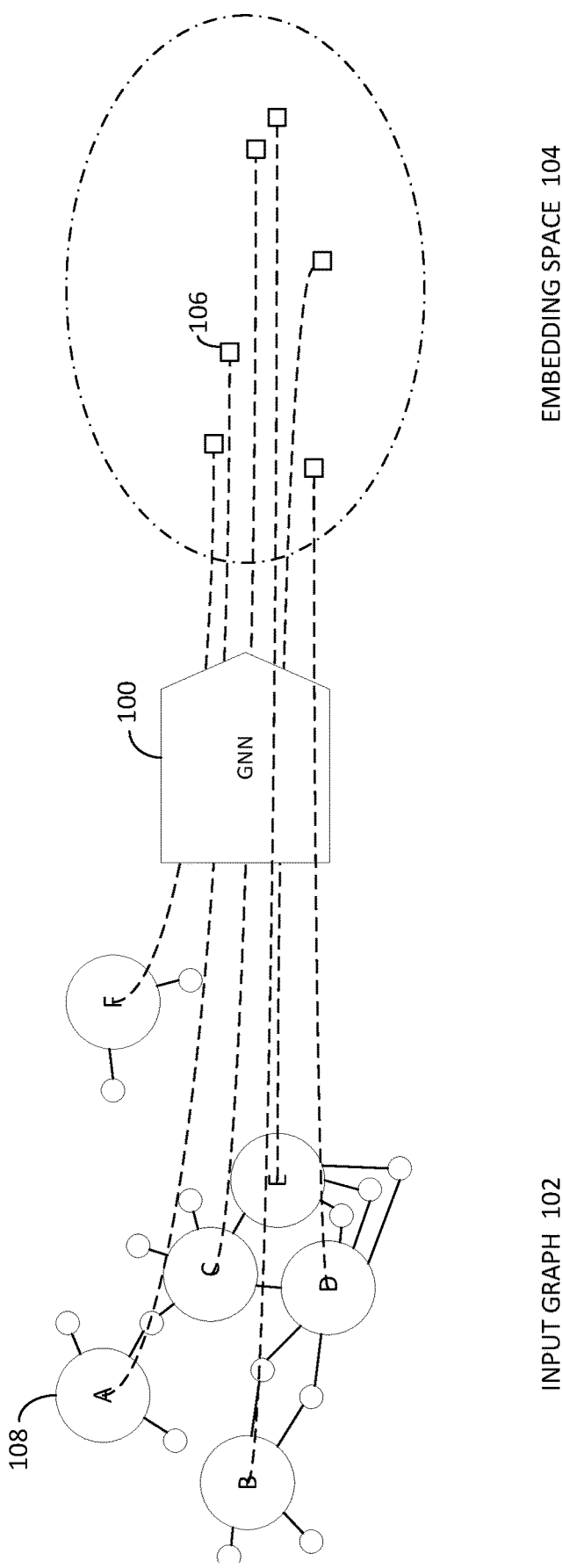
FIG. 1 is a diagram illustrating an example of a graph neural network (GNN) generating node embeddings in a common embedding space for each node of an input graph, consistent with embodiments of the present invention.

Consistent with some embodiments of the present invention, a holistic approach to generating a learned representation of a job posting involves generating an embedding for a job posting using a graph neural network (GNN). A GNN is a specific type of neural network that operates on graph data by generating for each node in an input graph a node embedding. By way of example, FIG. 1 illustrates an example of a GNN 100 operating as an encoder to generate for each node in an input graph 102, a corresponding embedding in an embedding space 104. Here, the larger nodes (e.g., labeled as A, B, C, D and E) in the input graph 102 are representative of job postings, while the smaller nodes are representative of standardized job attributes associated with job postings.

As illustrated in FIG. 1, the GNN encoder 100 has generated a node embedding 106 in the embedding space 104 for the job posting represented in the input graph as the node with label A and reference number 108. As described in greater detail in connection with the description of FIG. 4 below, when generating a node embedding for a particular node, the GNN 100 generates the embedding based on information associated with the node itself, in addition to information from nodes in the neighborhood (e.g., those nodes connected by an edge in the input graph), and information conveyed by the structure of the graph. As the GNN learns the structure of the graph and the relationships between nodes during the training phase, the parameters (e.g., the weight values) of the individual neurons of the GNN are adjusted to ensure that similar job postings will have similar embeddings in the embedding space. Consequently, job postings that have similar job titles and that share various standardized job attributes in common with one another will have similar vector representations, or embeddings, in the embedding space. Similarly, job postings that are connected via the graph will have similar embeddings in the embedding space.

As described in greater detail below in connection with FIG. 2, the first step in generating the node embeddings for each job posting is to define the input graph. Consistent with some embodiments, an input graph referred to herein as a unified job posting graph is formed by joining a job-to-attribute graph with a job-to-job graph, where the connections (e.g., edges) between the various job postings are determined based on analyzing the co-occurrence of certain user activities directed to a pair of job postings. For instance, first and second job postings may be connected via an edge in the input graph based on multiple people applying to a first job associated with the first job posting, and then subsequently applying for a second job associated with the second job posting. This user activity is referred to as a co-apply. Once the input graph has been defined, the GNN is trained with the task objective of predicting edges in the graph. Accordingly, the training data for training the GNN may consist of positive examples, in the form of a pair of job postings that are known to be connected, and negative examples, in the form of a pair of job postings known to not have a connection in the graph. Once trained, the GNN is applied to the entire input graph to derive for each node (e.g., each job posting) a node embedding that is a holistic representation of the job posting. Finally, consistent with some embodiments, the technique described herein involves what is known as an inductive technique, where the dataset used in training the GNN is different from the dataset used in testing, and the resulting GNN is capable of encoding new job postings not represented as nodes in the original input graph. Accordingly, when a new job posting is posted to the online job hosting service, the GNN encoder can be invoked to generate a new embedding for the new job posting.

In contrast with other techniques, the technique described herein has low online inference latency. For example, other techniques for encoding a job posting may involve deep, multi-layered neural networks, and thus, introduce significant delay during the inference stage. Consistent with some embodiments of the present invention, the GNN encoder has only one hidden layer and therefore the GNN encoder can generate an embedding for a job posting efficiently, with minimal latency at inference time.

Figure 2:
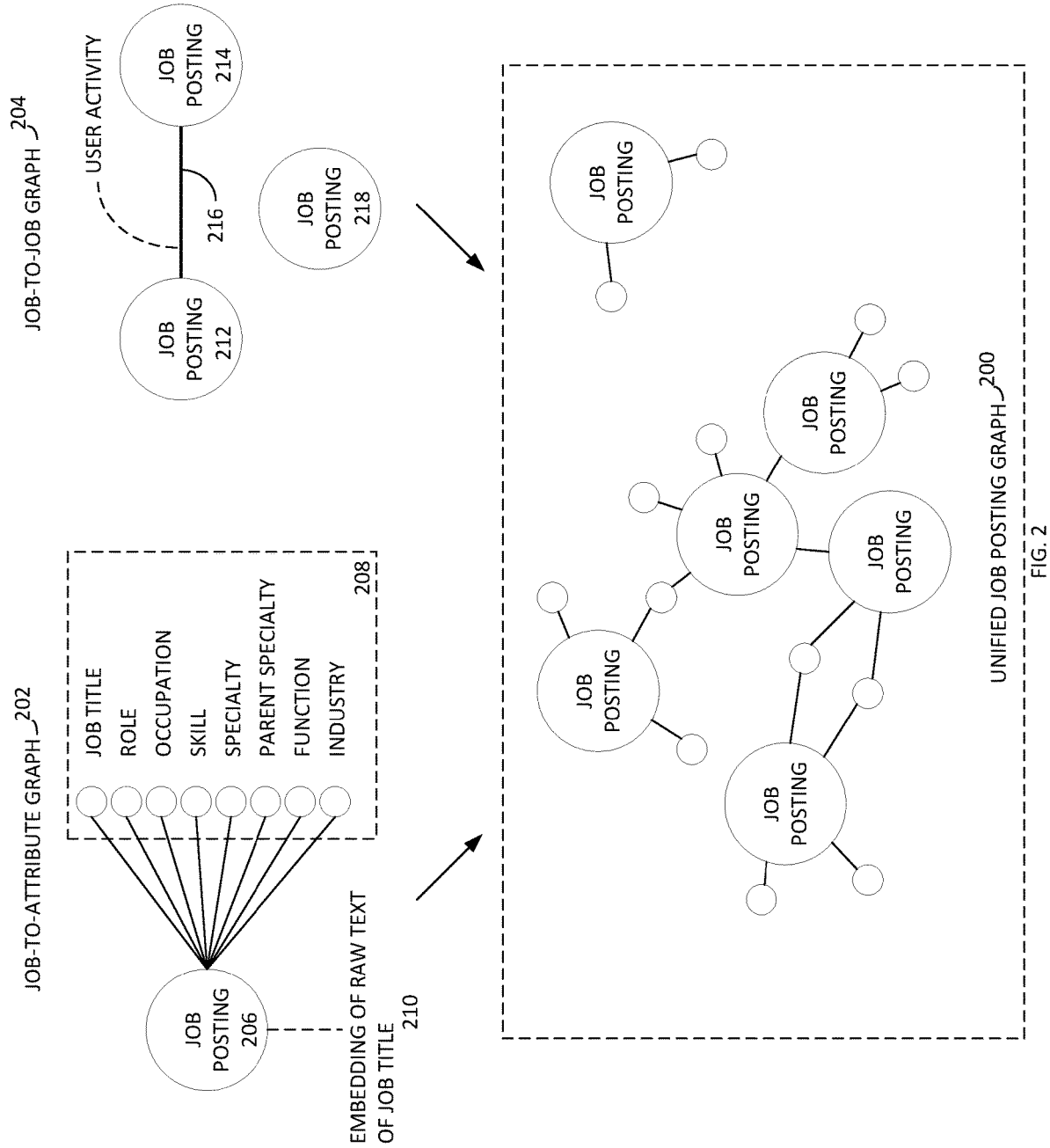
FIG. 2 is a diagram illustrating an example of how a unified job posting graph may be formed by joining a job-to-attribute graph and a job-to-job graph, where the unified job posting graph is for use as an input graph with a GNN, consistent with an embodiment of the present invention.

Referring now to FIG. 2, GNNs operate on graph data. Accordingly, the first task in any graph-based analysis using a GNN is to structure the data to be analyzed or processed as an input graph. Some types of data have an inherent graph structure, such as a social graph developed and maintained by a social networking service, where the connections established between people via the social networking service form the edges of the social graph and provide information about the relationships between the people, which are typically represented as nodes in the graph. However, in other instances the data may not necessarily have an inherent graph structure, and hence, the graph must first be defined. FIG. 2 is a diagram illustrating an example of how a unified job posting graph 200 may be formed by joining a job-to-attribute graph 202 and a job-to-job graph 204, consistent with an embodiment of the present invention.

As shown in FIG. 2, the job posting with reference 206 is a node, or vertex, in a job-to-attribute graph 202. In this instance, the node 206 is connected via several edges to other nodes representing standardized job attributes 208. For example, as shown in FIG. 2, the standardized job attributes 108 include a job title, a role, an occupation, a skill, a specialty, a parent specialty, a function, and an industry. In this context, a specialty is a pursuit, area of study, or skill to which a user has devoted much time and effort and in which they are expert. While specialties may include skills, not all skills are specialties. For example, "Accounting" may be both a skill and a specialty, but not every skill that falls within the category of or is otherwise related to "Accounting" is necessarily a specialty. In some embodiments, specialties are a subset of skills. For example, an online service may manage a list of 40,000 skills, and only 1,400 of 40,000 skills may be identified and treated by the online service as specialties.

For each of these several standardized job attributes 208, one or more values for the standardized attribute is generated from the data representing and/or otherwise associated with the online job posting 206. By way of example, using a variety of natural language processing and machine learning techniques, one or more specific skills may be identified as being associated with the online job posting. Similarly, based on the raw text of the job title and other information associated with the job posting, a single standardized job title may be selected as representative of the job title for the job posting. Accordingly, with some standardized job attributes (e.g., such as skills) multiple values may be derived and associated with the online job posting, whereas, with other standardized job attributes (e.g., job title), only a single value may be derived and associated with the job posting. The value of each standardized job attribute may have or be associated with an identifier by which the standardized attribute can be referenced. For example, the skill, "C++ Programming," may be associated with a skill identifier that identifies and represents the skill in a knowledge graph, taxonomy, ontology, or some other classification scheme. In addition, the value of each standardized attribute may be represented by an embedding. It is this embedding—for example, a vector representation—representing the value of a standardized attribute that is ultimately used as an input to the GNN for generating the node embeddings, which are the learned representation of the individual job postings.

Also shown in FIG. 2, the online job posting 206, which is a node in the job-to-attribute graph, is originally represented as an embedding 210 of the raw text of the job title for the job posting, as derived by a pre-trained machine learning model. For example, the raw text of the original job posting may be used as input to a pre-trained machine learning model to derive for the raw text of the job title, an embedding. Any of a number of machine learning techniques and corresponding models may be used to generate the embedding for the raw title of the text of the job posting. For example, consistent with some embodiments, an embedding of the raw text of a job title of a job posting may be derived using a Universal Sentence Encoder model, a software library known as fastText, or a pre-trained Transformer encoder.

Referring now to the job-to-job graph 204 in the upper right portion of FIG. 2, the pair of job postings with reference numbers 212 and 214 are nodes in the graph 204, connected by an edge 216. Consistent with some embodiments of the invention, an edge 216 is formed to connect two job postings based on applying a set of rules relating to user activity that has been logged by an activity logging service of the online job hosting service. For example, with some embodiments, an activity log is analyzed to derive a count of the number of users who have taken a particular action with respect to a pair of job postings. For instance, if a user applies to a first job posting, and then within some predetermined amount of time, the same user applies to a second job posting, this combination of actions by the user is counted as an activity referred to as a co-apply. With some embodiments, the edges connecting job postings in the job-to-job graph 204 are based on determining that a certain minimum number of users co-applied to a particular pair of job postings. The intuition here is that if multiple people are applying to the same two jobs, there is a high likelihood that the jobs described in the job postings are similar, and therefore should be connected in the job-to-job graph 204. With some embodiments, other user activities may be analyzed and counted for purposes of forming edges between nodes representing job postings. For example, a co-view is a user activity that involves a user selecting a first job posting to view, for example, as presented in a job search results interface or job recommendation interface, followed by the user selecting a second job posting to view. Similarly, a co-share is a user activity that involves a first user sharing a first job posting with a second user, and then the first user sharing a second job posting with the same user. These activities (e.g., co-applies, co-views, co-shares) by the user can be used as inferred signals to indicate that two job postings may be similar to one another, and should therefore be connected in the job-to-job graph 104 by an edge.

Consistent with some embodiments, the rules that are applied to establish the connections or edges between job postings in the job-to-job graph may specify a minimum number of co-applies, co-views, co-shares, or some weighted combination of the various user activities, that are necessary before an edge is created in the input graph to connect two job postings. Other rules may involve or relate to the timing of the user activities. For example, in some instances, a co-apply is considered for purposes of establishing an edge between two job postings only when the first application and the second application occur within some predefined window of time—such as three years. The intuition here is that the closer in time that the two job applications occur, the more likely it is that the job postings are similar. With some embodiments, if a particular job posting is paired with a significant number of other job postings to which various users have co-applied, only some subset of the parings will be considered for connection with an edge in the graph. For example, the selection of the subset of pairs of job postings may be based on the combination of job postings having the highest number of co-applies. By way of example, if a particular job posting (e.g., job posting A) has been co-applied at a high rate with a high number of other job postings, it may be the case that some predetermined number of the pairs of job postings having the highest number of co-applies are selected for purposes of establishing edges between pairs of job postings. As shown in FIG. 2, the unified job posting graph 200 is derived by simply joining the job-to-attribute graph 202 with the job-to-job graph 204. The unified job posting graph 200 is then used as the input graph on which the GNN is trained, and from which the node embeddings are derived.

Figure 3:
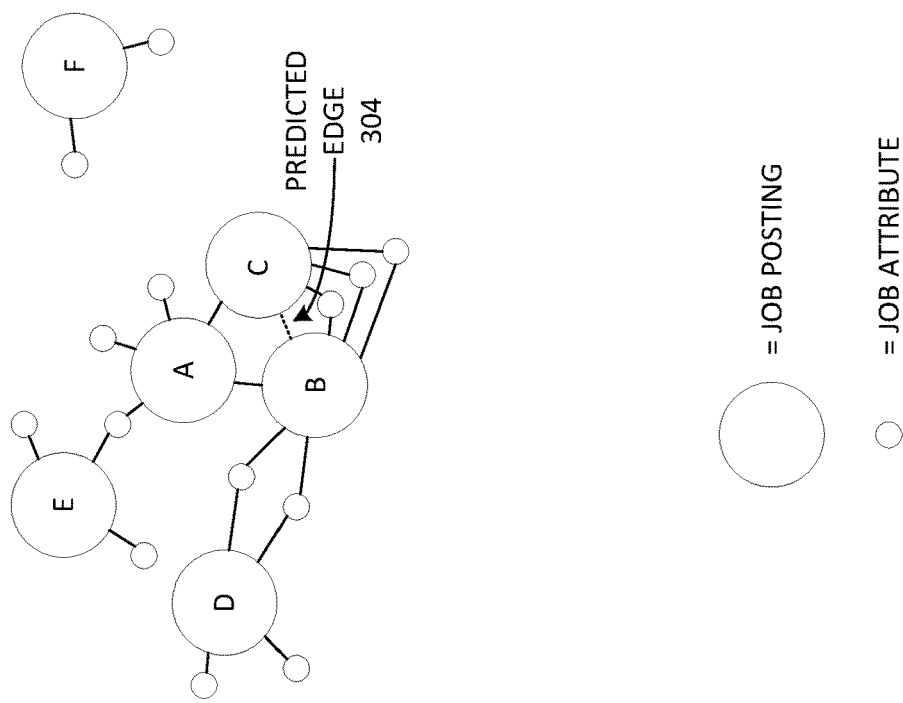
FIG. 3 is a diagram illustrating the self-supervised training of a GNN based on an edge prediction task, where the training data consists of pairs of nodes representing job postings, consistent with embodiments of the invention.
Figure 3:
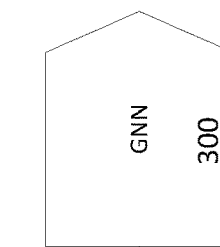
Figure 3:
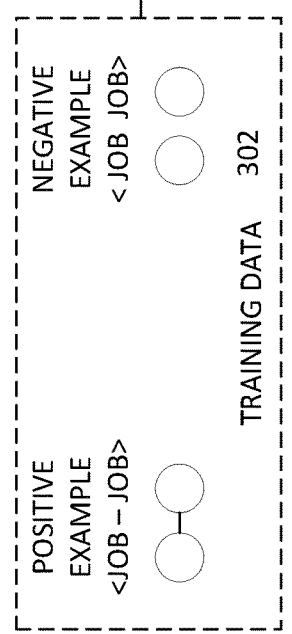
Figure 3:
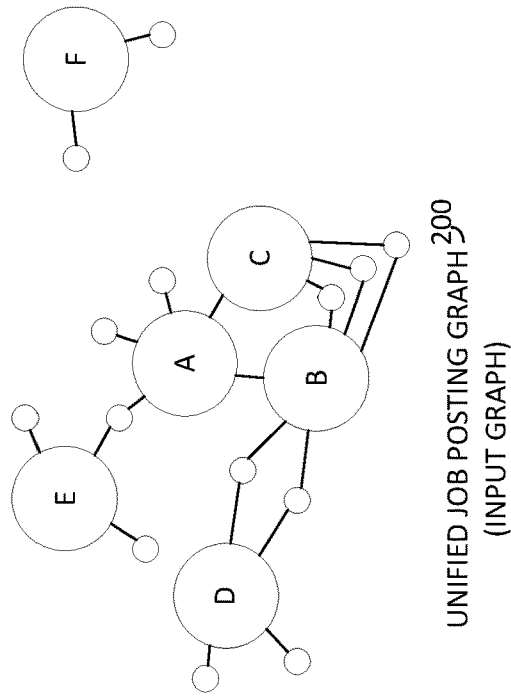

Referring now to FIG. 3, once the unified job posting graph 100 has been constructed, the next step involves training a GNN 300 to generate node embeddings for the nodes, based on the input graph 100. Consistent with some embodiments, a GNN 300 is trained with the objective or learning task of predicting an edge between nodes (e.g., job postings) in the graph. For example, the GNN is provided an instance of training data 302—for example, a pair of nodes representing job postings—and the objective is to predict whether an edge connects the two nodes. As shown in FIG. 3, the training data 302 that is used to train the GNN involves positive examples—pairs of job postings in the unified job posting graph that are known to be connected by an edge—and negative examples—pairs of job postings in the unified job posting graph that are known to not have an edge. If, for example, the training data is the pair of nodes shown in FIG. 3 with labels B and C, the objective of the training task is to determine a value for use in predicting whether an edge 304 connects the nodes in the input graph. In this sense, the edge prediction task is a binary classification problem where the label simply indicates whether an edge is present between two nodes, or not. Furthermore, as a portion of the input graph is used as the training data, without requiring any data labeling from an external source, the training of the GNN 300 may be considered or characterized as self-supervised.

Figure 4:
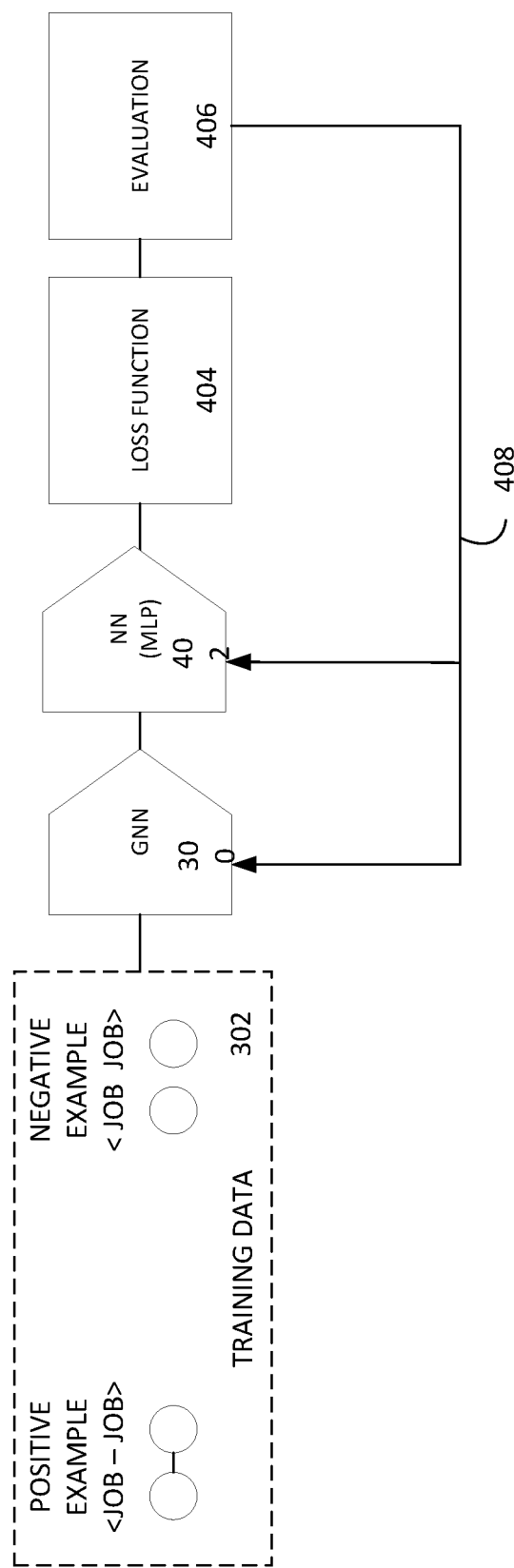
FIG. 4 is a diagram illustrating how a graph neural network is trained, consistent with an embodiment of the invention.

Referring now to FIG. 4, consistent with some embodiments, during the training phase, the parameters (e.g., the weights) of the neurons of the GNN 300 are randomly initialized. To train the GNN 300, individual instances of training data are selected, where some instances represent positive examples and some negative examples. For instance, a positive example is a pair of nodes in the graph, with each node representing a job posting, where the nodes are known to have a connecting edge. A negative example is a pair of nodes known to not have a connecting edge. After processing a first instance of training data 302, the GNN 300 outputs an embedding or vector representation for each node in the pair of nodes representing the instance of training data. Next, the two embeddings or vector representations for the pair of nodes are concatenated and provided as input to a neural network (NN) 402, which performs a binary classification task by processing the concatenated embeddings to generate an output in the form of a probability score that represents a measure of likelihood that the two nodes are similar, such that the two nodes should be connected by an edge. Consistent with some embodiments, the neural network 402 that performs the binary classification task is a Multi Layer Perceptron (MLP) neural network having a single layer. During training, the probability score as output by the neural network 402 is provided as an input to a module (e.g., loss function 404) for deriving a measure of loss. Consistent with some embodiments, the loss function may be a cross entropy function, and the loss may generally be characterized as a difference between two probability distributions. For instance, the loss may be the difference between a first probability distribution corresponding with the actual label for the pair of nodes, and the probability distribution of edge values derived by the output layer of the neural network 402—typically, after applying an activation function, such as SoftMax. Next, the loss derived by the loss function module 404 is evaluated by an evaluation function 406. If, for example, when processing an instance of training data, the GNN 300 and neural network 404 predict that two nodes represented by the training data are connected by an edge, when, the nodes from the instance of training data are not connected by an edge, the evaluation function will generate and backpropagate 408 values for updating the parameters of the GNN 300 and neural network 402, with the objective of training the GNN 300 and neural network 402 to make a more accurate prediction. This process is repeated iteratively with individual instances of training data until the edge prediction task obtains some level of accuracy in processing the training data.

Figure 5:
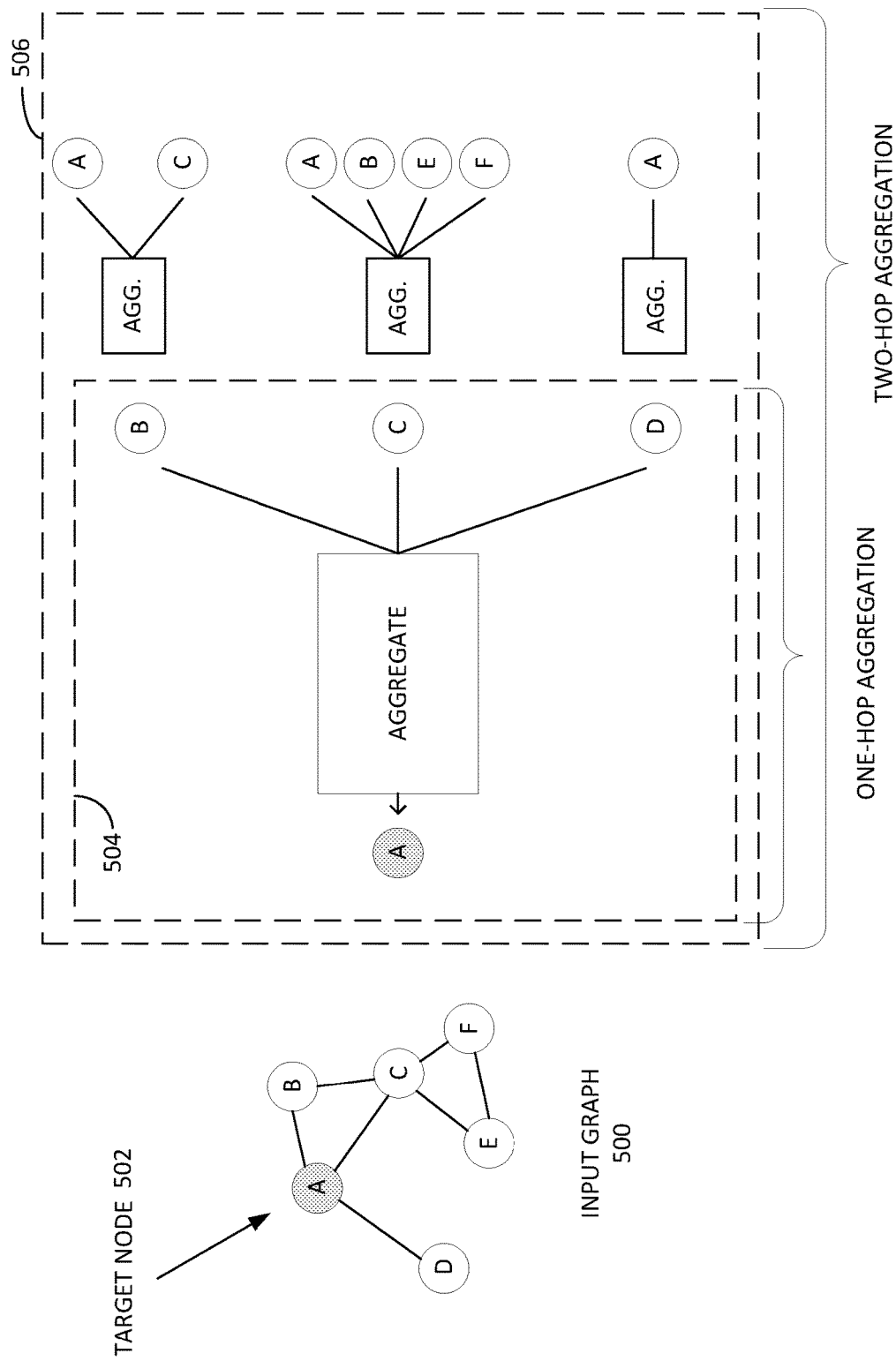
FIG. 5 is a diagram illustrating the concept of aggregation, as it relates to a GNN, according to an embodiment of the invention.

Referring now to FIG. 5, when generating a node embedding for each node in the input graph, the pre-trained GNN performs what are commonly referred to in the art as an aggregation function, followed by an update function. As a general matter, the aggregation and update functions are the operations by which the GNN obtains information from neighboring nodes and combines this information for generating the node embedding for each node. More specifically, the aggregation function is typically characterized as the operation by which information from neighboring nodes is obtained and combined, while the update function is typically characterized as the operation by which the aggregate information obtained from neighboring nodes is combined with the existing information of the target node. Various GNN models utilize different techniques to perform the aggregation and update functions. Consistent with embodiments of the present invention, the aggregation function, and in some cases the update function, are learned functions in the sense that the parameters of the GNN used in performing the aggregation and/or update functions are learned as a result of the training process. FIG. 5 illustrates the concepts of aggregation and updating as it relates to a GNN, consistent with various embodiments of the present invention.

As illustrated in FIG. 5, a portion of an input graph 500 is shown, where the node with label ("A") and reference number 502 is the target node—that is, the node for which the node embedding is being derived. Consistent with an embodiment of the present invention, the target node is representative of an online job posting generally, and has an initial embedding—for example, based on the raw text of the job title for the online job posting. As shown in FIG. 5, the target node ("A") has three neighbors—the nodes with labels, "B", "C" and "D". The bounding box with reference number 504 corresponds with what is referred to as a one-hop neighborhood aggregation technique, as the node embedding generated for the target node ("A") is based on information (e.g., embeddings) associated with all nodes in the one-hop neighborhood. Specifically, the one-hop neighborhood includes all nodes directly connected to the target node by an edge in the input graph. The aggregation function receives as input an embedding associated with each node in the one-hop neighborhood (e.g., the nodes with labels, "B", "C" and "D"), and combines or aggregates the embeddings in a manner consistent with the learned aggregation function for the GNN. Although not separately shown in FIG. 5, an update function learned for the GNN will then update an embedding associated with the target node by combining the embedding associated with the target node with the embedding that results from the aggregation function.

With a technique that uses a one-hop neighborhood aggregation function, the result of the aggregation and update functions is the resulting node embedding for the target node. However, in a multi-hop neighborhood aggregation technique, information from additional nodes—for example, nodes connected to the target node via one or more intermediary nodes—will be aggregated, iteratively, and ultimately combined with an embedding associated with the target node. Accordingly, as shown by the bounding box with reference number 506, a technique that involves aggregating information from a two-hop neighborhood is shown.

Consistent with some embodiments of the present invention, the GNN is implemented using a particular form of graph convolutional network (GCN) model referred to as the pinSage model. This particular model is beneficial in that it is a web-scale model that provides the ability to process extremely large input graphs as may be used with various online, web-based services. In various alternative embodiments, other models may be used, to include models based on GraphSage or Graph Attention Network (GAT). Consistent with some embodiments, the aggregation technique that is used with the GCN model is a one-hop, normalized neighborhood aggregation technique referred to generally as mean pooling. With a mean pooling aggregation function, the embeddings from each node in the neighborhood are summed, and then normalized, for example, by taking the average or mean. By taking the average or mean of the embeddings from the neighborhood nodes, problems that may arise with significant variations in the degrees of the nodes are lessened. In alternative embodiments of the invention, other aggregation functions and update techniques may be used, to include element-wise mean, element-wise sum, encoder-decoder style attention, self-attention, additive attention, and other techniques based on pooling (e.g., set pooling or Janossy pooling).

Figure 6:
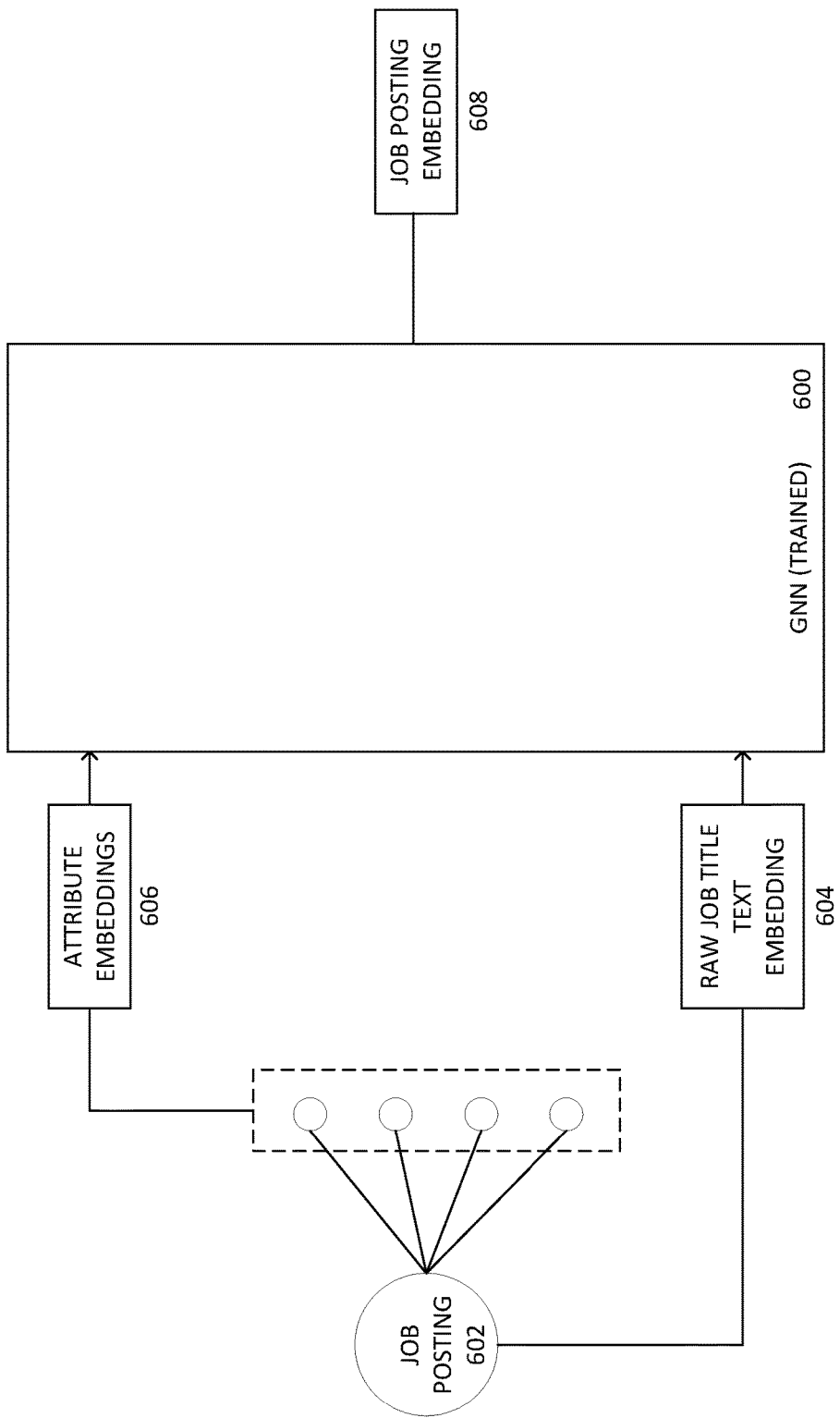
FIG. 6 is a diagram of an inductive GNN encoder for use in generating an embedding for a new job posting not included in the original input graph, consistent with some embodiments of the present invention.

FIG. 6 is a diagram of an inductive GNN encoder for use in generating an embedding for a new job posting not included in the original input graph, consistent with some embodiments of the present invention. As illustrated in FIG. 6, after a GNN 600 has been trained, and subsequent to the GNN 600 being used to derive node embeddings for each node in the input graph, the GNN 600 is used to derive an embedding for a new online job posting 602—for example, one that is not in the original input graph. Accordingly, upon receiving a new online job posting 602 at the job hosting service, the online job posting 602 is first analyzed using a variety of natural language processing and machine learning techniques to generate for the new job posting an embedding 604 of the raw text of the job title of the new online job posting, and various embeddings 606 corresponding with values of a variety of different standardized job attributes. The embedding 604 of the raw text of the job title of the new online job posting and the various embeddings 606 corresponding with the values of the several standardized attributes are provided as input to the GNN 600, which outputs an embedding 608 that is a holistic, learned representation of the new online job posting.

Consistent with some embodiments, each embedding that represents an online job posting may be used as an input feature to any number of machine learning models that are used in various tasks. By way of example, with some embodiments, an embedding of a job posting may be used as an input feature with a machine learning model that has been trained to predict or otherwise identify skills associated with a job posting. Similarly, an embedding of a job posting may be used as an input feature with a machine learning model that is used in ranking job postings in the context of a search for job postings or in generating job recommendations to present to a user.

Figure 7:
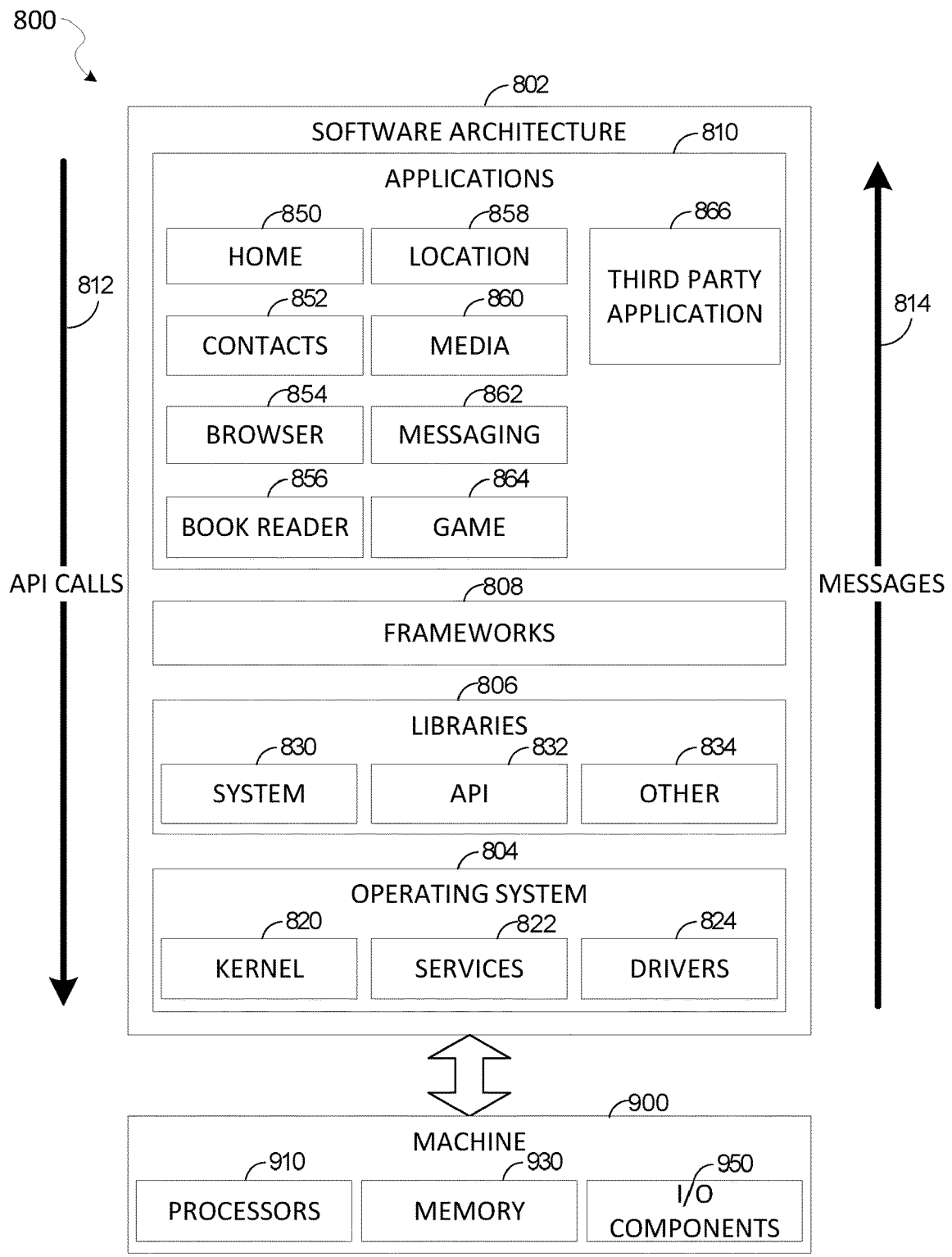
FIG. 7 is a block diagram illustrating a software architecture, which can be installed on any of a variety of computing devices to perform methods consistent with those described herein.

FIG. 7 is a block diagram 800 illustrating a software architecture 802, which can be installed on any of a variety of computing devices to perform methods consistent with those described herein. FIG. 7 is merely a non-limiting example of a software architecture, and it will be appreciated that many other architectures can be implemented to facilitate the functionality described herein. In various embodiments, the software architecture 802 is implemented by hardware such as a machine 900 of FIG. 8 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 606 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 8:
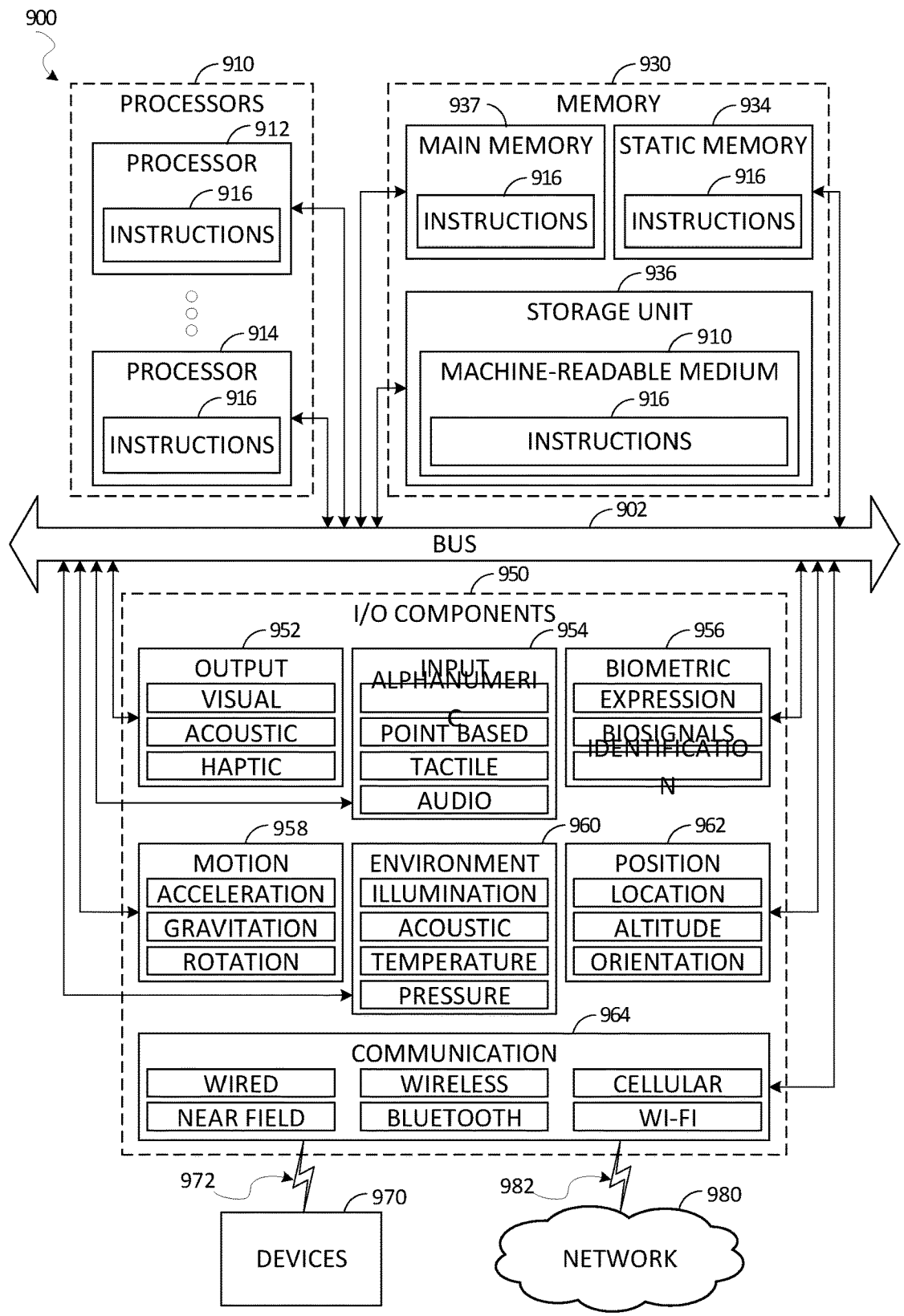
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 900 in the form of a computer system within which a set of instructions may be executed for causing the machine to perform any one or more of the methodologies discussed herein, according to an example embodiment. Specifically, FIG. 8 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithms described herein. Additionally, or alternatively, the instructions 916 may implement a system or model as described in connection with FIGS. 3 and 5, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for generating an embedding for an online job posting hosted at an online job hosting service, the method comprising:

applying a set of rules to data relating to a plurality of online job postings to derive from the data an input graph having edges connecting nodes of at least two different node types, the input graph comprising i) a plurality of nodes of a first node type, each node of the first node type an embedding derived from raw text of a job title of an online job posting, and ii) a plurality of nodes of a second node type, each node of the second node type an embedding representing a value of one of a plurality of standardized job attributes, wherein the plurality of nodes of the second node type comprise two or more nodes associated with different standardized job attribute types of a plurality of standardized job attribute types;

training a graph neural network (GNN) to generate a node embedding for each node in the input graph, the GNN implemented with an aggregation function that generates the node embedding of each node with information aggregated from at least a one-hop neighborhood, the GNN trained based on an edge prediction task using as training data positive examples and negative examples, the positive examples consisting of a pair of nodes in the input graph connected by an edge, and the negative examples consisting of a pair of nodes in the input graph not connected by an edge; and subsequent to training the GNN:

processing the input graph with the trained GNN to generate for each node a node embedding;

receiving at the online job hosting service a new online job posting;

processing the raw text of a job title of the new online job posting to derive an embedding for the job title of the new online job posting;

obtaining at least one embedding for a value of a standardized job attribute having a standardized job attribute type of the plurality of standardized job attribute types, the value for a standardized job attribute associated with the new online job posting; and with the GNN, generating an embedding for the new online job posting using as input data to the GNN the embedding for the job title and the embeddings corresponding with the values for the standardized job attributes.

2. The computer-implemented method of claim 1, wherein applying the set of rules to data relating to a plurality of online job postings to derive from the data an input graph having nodes and edges, further comprises:
identifying a plurality of pairs of online job postings to which at least a predetermined number of users have co-applied within a predetermined duration of time; and
generating an edge in the input graph to connect each pair of online job postings in the identified plurality of pairs of online job postings.

3. The computer-implemented method of claim 1, wherein processing the raw text of the job title of the new online job posting to derive an embedding for the job title of the new online job posting comprises:
processing the raw text of the job title of the new online job posting with a pre-trained Transformer encoder to derive the embedding for the job title of the job posting.

4. The computer-implemented method of claim 1, further comprising:
subsequent to generating the embedding for the new online job posting, using the embedding for the new online job posting as an input feature to a machine learning model that has been pre-trained to predict skills associated with an online job posting.

5. The computer-implemented method of claim 1, wherein the GNN is implemented as a graph convolutional network model, and the aggregation function that generates the node embedding of each node with information aggregated from at least a one-hop neighborhood is implemented as a mean pooling technique.

6. The computer-implemented method of claim 5, wherein the GNN is implemented based on a pinSage model.

7. The computer-implemented method of claim 1, wherein the plurality of standardized job attribute types comprise:
a standardized job title;
a standardized role;
a standardized occupation;
a standardized skill;
a standardized specialty;
a standardized parent specialty;
a standardized job function;
a standardized industry, or
any combination thereof.

8. A system comprising:
A memory device storing instructions; and
At least one processor, which, when executing the instructions, causes the system to perform operations comprising:
applying a set of rules to data relating to a plurality of online job postings to derive from the data an input graph having edges connecting nodes of at least two different node types, the input graph comprising i) a plurality of nodes of a first node type, each node of the first node type an embedding derived from raw text of a job title of an online job posting, and ii) a plurality of nodes of a second node type, each node of the second node type an embedding representing a value of one of a plurality of standardized job attributes, wherein the plurality of nodes of the second node type comprise two or more nodes associated with different standardized job attribute types of a plurality of standardized job attribute types;
training a graph neural network (GNN) to generate a node embedding for each node in the input graph, the GNN implemented with an aggregation function that generates the node embedding of each node with information aggregated from at least a one-hop neighborhood, the GNN trained based on an edge prediction task using as training data positive examples and negative examples, the positive examples consisting of a pair of nodes in the input graph connected by an edge, and the negative examples consisting of a pair of nodes in the input graph not connected by an edge; and
subsequent to training the GNN:
processing the input graph with the trained GNN to generate for each node a node embedding;
receiving a new online job posting;
processing the raw text of a job title of the new online job posting to derive an embedding for the job title of the new online job posting;
obtaining at least one embedding for a value of a standardized job attribute having a standardized job attribute type of the plurality of standardized job attribute types, the value for a standardized job attribute associated with the new online job posting; and
with the GNN, generating an embedding for the new online job posting using as input data to the GNN the embedding for the job title and the embeddings corresponding with the values for the standardized job attributes.

9. The system of claim 8, comprising additional instructions, which, when executed by the processor, causes the system to perform additional operations, comprising:
identifying a plurality of pairs of online job postings to which at least a predetermined number of users have co-applied within a predetermined duration of time; and
generating an edge in the input graph to connect each pair of online job postings in the identified plurality of pairs of online job postings.

10. The system of claim 8, wherein said operation of processing the raw text of the job title of the new online job posting to derive an embedding for the job title of the new online job posting comprises:
processing the raw text of the job title of the new online job posting with a pre-trained Transformer encoder to derive the embedding for the job title of the job posting.

11. The system of claim 8, comprising additional instructions, which, when executed by the processor, causes the system to perform additional operations, comprising:
subsequent to generating the embedding for the new online job posting, using the embedding for the new online job posting as an input feature to a machine learning model that has been pre-trained to predict skills associated with an online job posting.

12. The system of claim 8, wherein the GNN is implemented as a graph convolutional network model, and the aggregation function that generates the node embedding of each node with information aggregated from at least a one-hop neighborhood is implemented as a mean pooling technique.

13. The system of claim 12, wherein the GNN is implemented based on a pinSage model.

14. The system of claim 8, wherein the plurality of standardized job attribute types comprise:
a standardized job title;
a standardized role;
a standardized occupation;
a standardized skill;

a standardized specialty;
a standardized parent specialty;
a standardized job function; and/or
a standardized industry.

15. A system comprising:

Means for applying a set of rules to data relating to a plurality of online job postings to derive from the data an input graph having edges connecting nodes of at least two different node types, the input graph comprising i) a plurality of nodes of a first node type, each node of the first node type an embedding derived from raw text of a job title of an online job posting, and ii) a plurality of nodes of a second node type, each node of the second node type an embedding representing a value of one of a plurality of standardized job attributes, wherein the plurality of nodes of the second node type comprise two or more nodes associated with different standardized job attribute types of a plurality of standardized job attribute types;

Means for training a graph neural network (GNN) to generate a node embedding for each node in the input graph, the GNN implemented with an aggregation function that generates the node embedding of each node with information aggregated from at least a one-hop neighborhood, the GNN trained based on an edge prediction task using as training data positive examples and negative examples, the positive examples consisting of a pair of nodes in the input graph connected by an edge, and the negative examples consisting of a pair of nodes in the input graph not connected by an edge; and subsequent to training the GNN:

means for processing the input graph with the trained GNN to generate for each node a node embedding;

means for receiving at the online job hosting service a new online job posting;

means for processing the raw text of a job title of the new online job posting to derive an embedding for the job title of the new online job posting;

means for obtaining at least one embedding for a value of a standardized job attribute having a standardized job attribute type of the plurality of standardized job attribute types, the value for a standardized job attribute associated with the new online job posting; and with the GNN, generating an embedding for the new online job posting using as input data to the GNN the embedding for the job title and the embeddings corresponding with the values for the standardized job attributes.

16. The system of claim 15, further comprising:

means for processing one or more rules to identify a plurality of pairs of online job postings to which at least a predetermined number of users have co-applied within a predetermined duration of time; and means for generating data to represent an edge in the input graph connecting each pair of online job postings in the identified plurality of pairs of online job postings.

17. The system of claim 15, further comprising:

means for processing the raw text of the job title of the new online job posting with a pre-trained Transformer encoder to derive the embedding for the job title of the job posting.

* * * * *